March 1, 1927.
R. C. LUPLOW
1,619,523
TRAFFIC SIGNAL FOR MOTOR VEHICLES
Filed Feb. 2, 1923    3 Sheets-Sheet 1
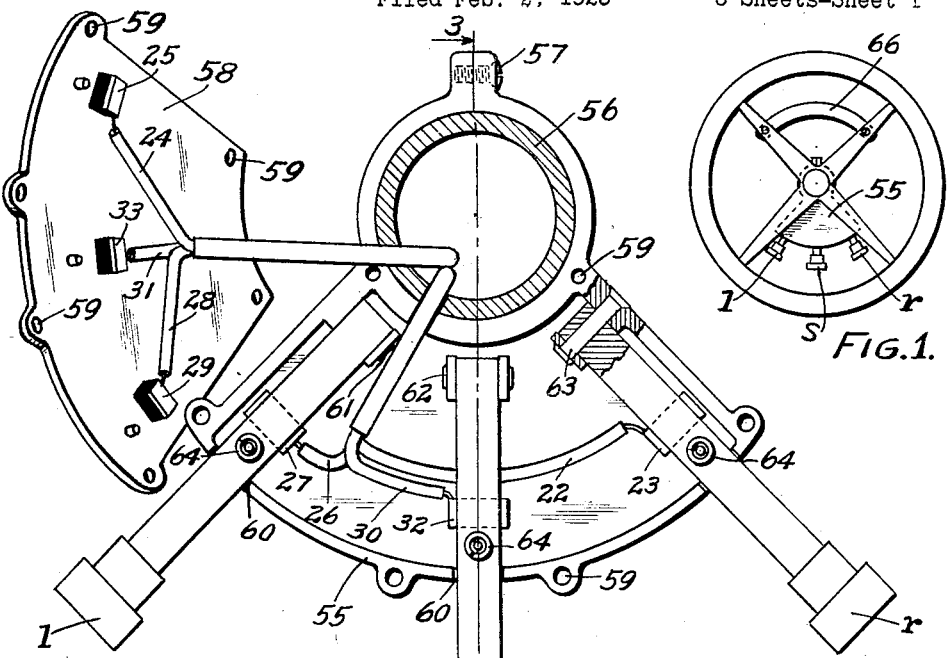
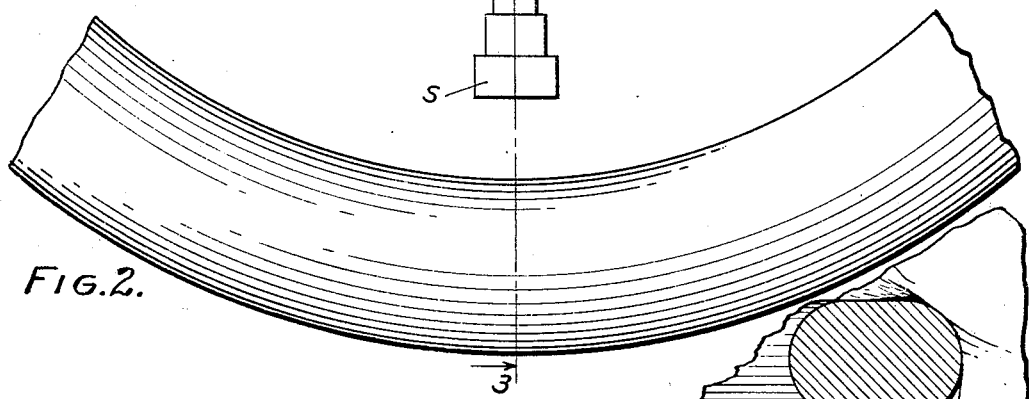
FIG.2.
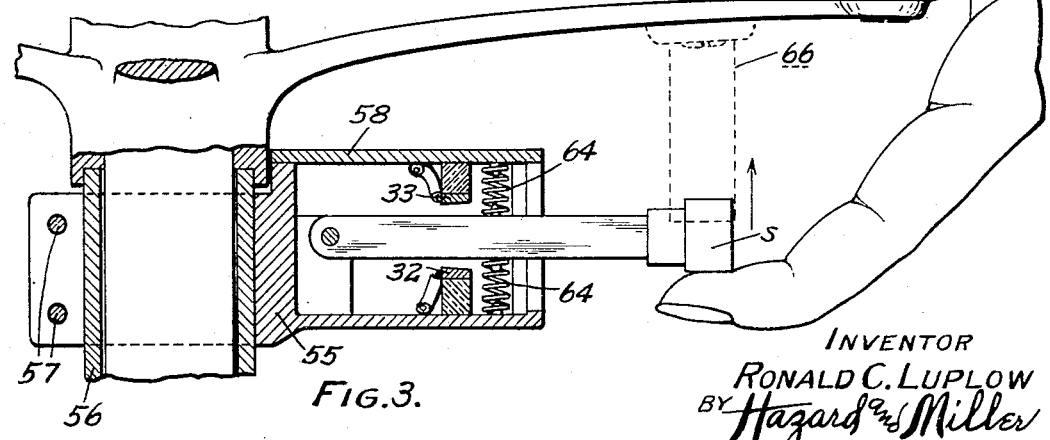
FIG.3.
INVENTOR
RONALD C. LUPLOW
BY Hazard and Miller
ATT'YS.

March 1, 1927. 1,619,523
R. C. LUPLOW
TRAFFIC SIGNAL FOR MOTOR VEHICLES
Filed Feb. 2, 1923   3 Sheets-Sheet 2
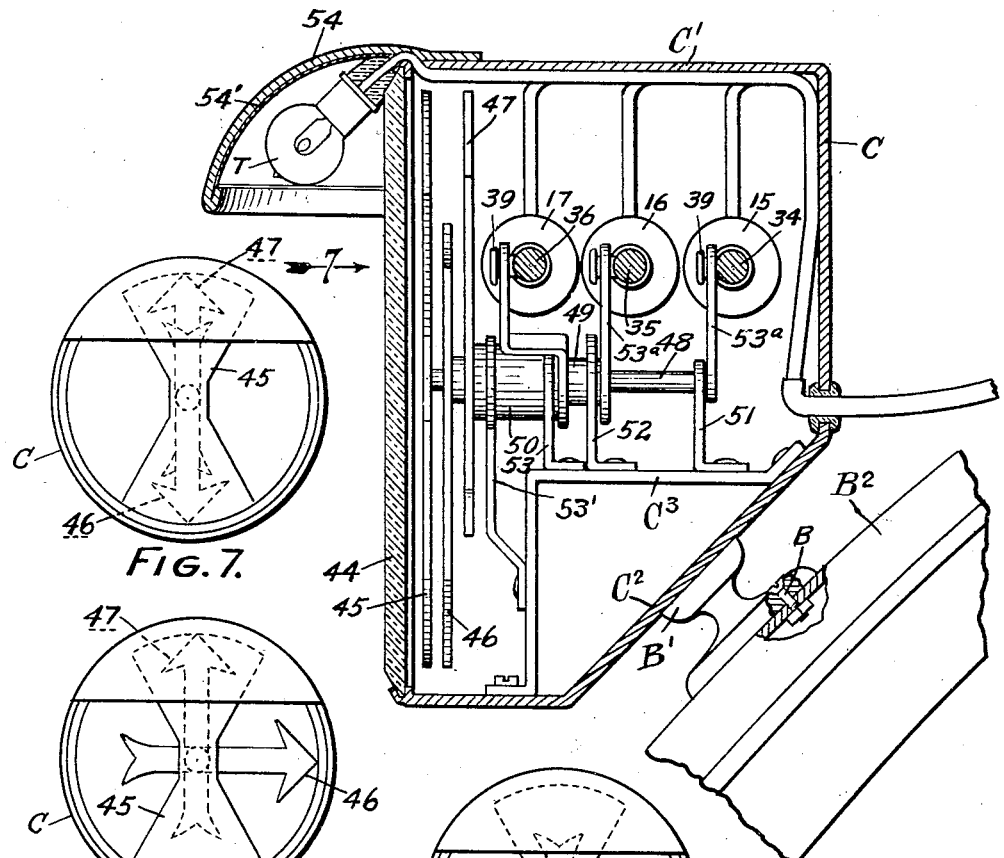
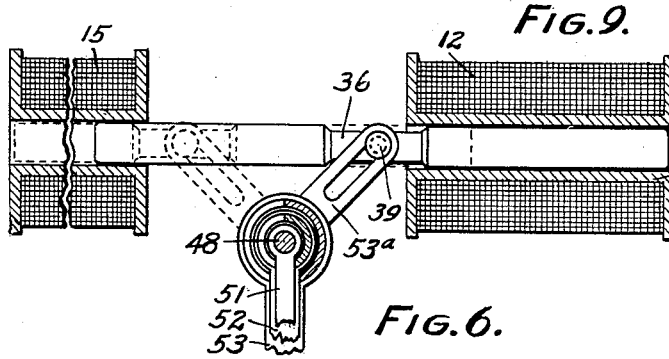
INVENTOR
RONALD C. LUPLOW
BY Hazard and Miller
ATT'YS.

March 1, 1927.

R. C. LUPLOW 1,619,523

TRAFFIC SIGNAL FOR MOTOR VEHICLES

Filed Feb. 2, 1923    3 Sheets-Sheet 3

INVENTOR
RONALD C. LUPLOW
BY Hazard & Miller
ATT'YS.

Patented Mar. 1, 1927.

1,619,523

UNITED STATES PATENT OFFICE.

RONALD C. LUPLOW, OF CALISTOGA, CALIFORNIA.

TRAFFIC SIGNAL FOR MOTOR VEHICLES.

Application filed February 2, 1923. Serial No. 616,525.

My present invention relates to a traffic signal or direction indicator for automobiles, a primary object of my invention being to provide a signal having controlling means within convenient reach, and preferably connected to the steering post of an automobile.

It is a further object of my device to provide a signal that may be operated by a touch of the finger, without necessitating a removal of the hand of an operative from the steering wheel.

It is a further object of my device to provide a signal or signals which shall be visible either by day or by night, and visible either from a rear position or from a position in advance of the machine.

It is a further object of my invention to provide a signal or indicating organization which may be easily attached to any one of the ordinary types of machines now on the market, without undue labor or disfigurement.

It is a further object of my invention to employ electrical means, and preferably electromagnetic means, for the operating of the signal or indicating elements of my device; and I prefer also to employ automatic means for restoring my indicator or signaling element to a normal position, as by a movement of the steering wheel to execute a turn which may have been indicated.

It is a further object of my invention to provide means for indicating a prospective stop, as well as a prospective turn to the right or to the left, and to indicate not only the fact but the direction of the intended turn.

It is a further object of my invention to provide a device of the character referred to which shall comprise but few moving parts, and no detents or other elements which are liable to a failure to operate or to release.

It is a further object of my invention to provide a device of the character referred to which shall be suitably illuminated without waste of electric current, and which may be constructed and applied without undue expense.

Further objects of my invention will appear from the following description and from the appended claim.

My invention is readily understood from the following description of an illustrative embodiment, taken in connection with the accompanying drawings, in which—

Figure 1 is a view looking down upon a steering wheel to whose post is attached a control box or housing and associated parts, of my preferred construction.

Fig. 2 is a view similar to Fig. 1, but on an enlarged scale, parts being cut away, and the top plate of the box, with its connections, being displaced and shown in perspective.

Fig. 3 is a diagrammatic section on the line 3—3 of Fig. 2, with parts broken away, the position occasionally occupied by a restoring cam being indicated in dotted lines, and one finger of an operative being also shown.

Fig. 4 is a vertical section through a signal casing and contained parts such as I prefer to employ at the rear of an automobile.

Fig. 6 is a detail of the actuator or signal operating means, as hereinafter described.

Figs. 7, 8, 9 and 10 show the signal element proper, the same being set in Fig. 7, to a neutral position; in Fig. 8, to indicate a right turn; in Fig. 9, to indicate a left turn; and in Fig. 10, to indicate a stop.

Broadly, my device comprises an electric circuit with controlling means, which controlling means I prefer to associate with the steering post and the steering wheel of an automobile, and signaling means, which I prefer to mount upon the front and rear fenders, electromagnetic means being preferably employed to operate the respective signals and to restore the same to a normal or non-indicating position.

Figure 11:
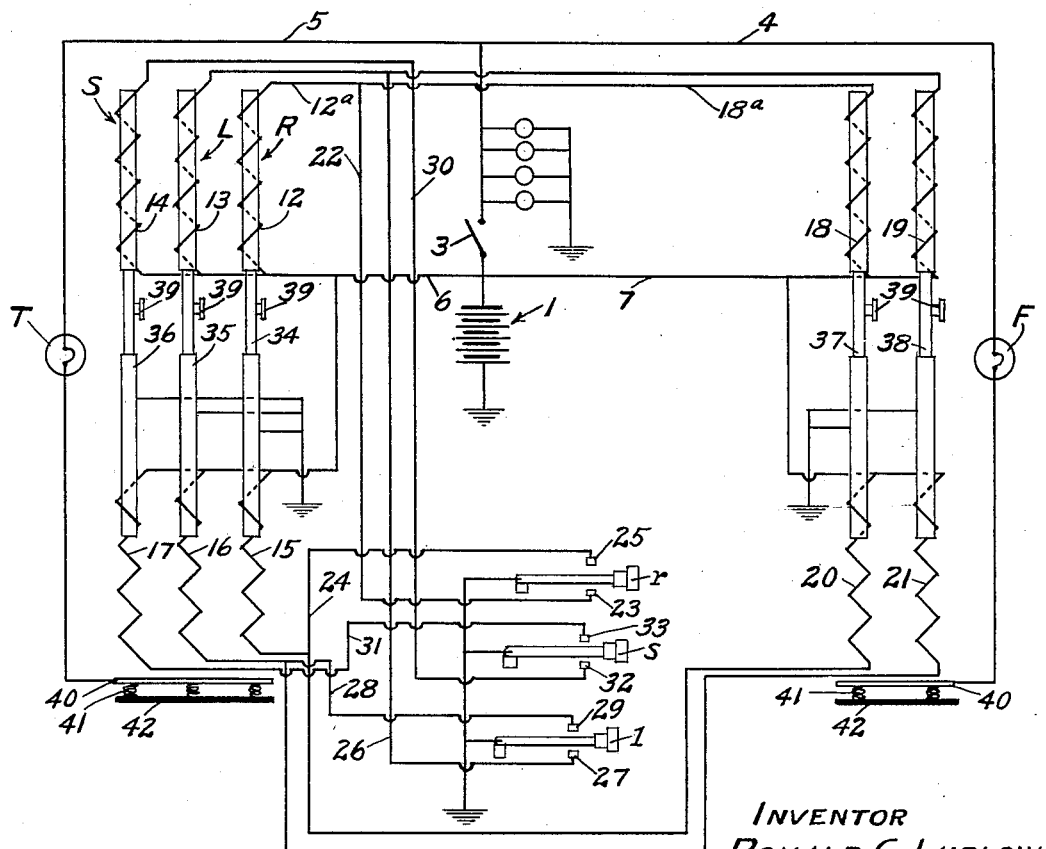
Fig. 11 is a wiring diagram, in which F is a front light, T is a rear light, and the contact makers $r$, $s$ and $l$, respectively, control the front and rear indicating means illuminated by the said lights.

Referring first to Fig. 11, in which are shown the circuits involved in a preferred embodiment of my invention, it will be understood that one side, for example, the negative side of the battery 1, or of another source of current is "grounded", by being connected with any suitable metallic part of the machine, the current employed being optionally the same current that is used for the general illumination of the car and of the road, a main switch for the lighting circuits being shown at 3, in the positive lead, and branches 4 and 5 being preferably carried therefrom respectively to the forward light F and the rearward light T, these lights being employed to illuminate respectively the forward indicator and the rearward indicator, although preferably supplied with current only when a change of direction or a stop is in prospect, as hereinafter explained.

It being understood that the circuit closers $r$, $s$ and $l$, which are employed to signal respectively a right turn, a stop, and a left turn, are housed in the manner indicated, the electrical features of my signaling device may be described as follows:

Branch 6, taken off from the mentioned lighting circuit, leads into the respective indicator casings (one rear casing C, and the parts therein, being shown in section in Fig. 4) and there divides to energize respectively restoring coils 12, 13 and 14 and setting coils 15, 16 and 17 of the respective actuators R, S and L of the rear signal; and branch 7 leads to the corresponding restoring coils 18, 19 and the respective setting coils 20, 21 of the forward indicator. Branches 12$^a$ from the restoring coil 12 of the rear indicator, and 18$^a$ from the restoring coil 18 of the front indicator are connected to a common return wire 22, which leads to a contact 23 cooperating with the grounded contact arm $r$. Similarly return wires from the setting coils 15 and 20 are connected to a common return wire 24 leading to the alternative contact 25, corresponding connections being made from restoring coils 13 and 19, by wire 26, to contact 27; and from setting coils 16 and 21, by wire 28, to contact 29, the contacts 27 and 29 cooperating with the switch arm $l$. Respective coils of the actuator S, employed only at the rear, are in turn connected by wires 30 and 31 with contacts 32 and 33, cooperating with switch arm $s$.

As will be understood from an inspection of the drawing, the magnetizable cores 34, 35, 36, of the rear set of actuators, and the magnetizable cores 37, 38, of the forward set of actuators, are each adapted to extend into two coils or solenoids constituting a pair and arranged substantially in alignment in the same horizontal plane, those coils which have been referred to as "setting" coils (for example, coil 15) being adapted to move a core, together with a signal operating stud which may be integral therewith or mounted thereon, in such a manner as to give a signal of a prospective turn or a stopping of the machine; and the other coil of each pair, already referred to as a "restoring" coil (for example, coil 12) being adapted to move the core, together with its stud, in an opposite direction,—to reset the signal at a neutral or non-indicating position when no change in the movement or in the direction of movement of the vehicle is in prospect.

Figure 5:
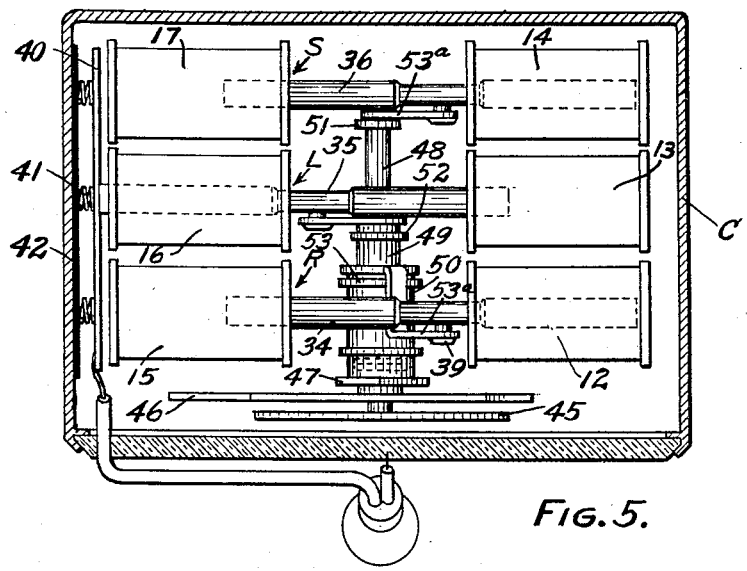
Fig. 5 is a corresponding top view, with the upper portion of the casing and wiring connections removed.

While the lights F, T might be permitted to burn continuously during hours of darkness, I prefer to provide means whereby they are turned on only when a turn or a stop is in prospect, and to this end I have devised automatic means, a preferred embodiment being indicated in Figs. 5 and 11. From an inspection of these figures it will be understood that I may so mount a conductive bar 40, supported by resilient elements 41 upon insulating blocks 42, that whenever one of the mentioned cores is moved, as by the passing of current through the corresponding setting coil, into a signaling position, the mentioned core, grounded by its contact with one of the sleeves 43 (Fig. 9) will complete a circuit through the filament of the corresponding light, the current being, however, cut off whenever the corresponding opposed or restoring coil is energized in its turn.

While the horizontal movement of the respective studs 39 might obviously be utilized to operate any one of many types of signaling elements, I prefer to employ these studs in the manner best shown in Figs. 4, 5 and 6, in which it will be understood that a rear signaling device is shown, by way of example.

A sight opening in the casing C, which casing may be secured to a fender by means such as the bolts B, is preferably provided with a glass plate 44, behind which are mounted, preferably upon a common axis, a concealing segment 45 and a plurality of arrows 46 and 47, these elements being preferably secured respectively to the rock shaft 48 and to the sleeves 49 and 50, supported by means such as the bearing elements 51, 52, 53 and 53', in the manner best shown in Fig. 4. The casing C is circular in end elevation and has a circular shell $C^1$ with a bevelled flat side $C^2$ to which the post $B^1$ is attached, said post $B^1$ being secured to the fender $B^2$ by the bolts B. A bracket $C^3$ is mounted in the casing and has a horizontal portion secured to the flat side $C^2$ and a vertical portion secured to the lower side of the circular shell $C^1$. The bearing elements, or posts 51, 52, 53 and 53', are rigidly mounted upon the bracket $C^3$. The sleeve 50 is mounted in the posts 53 and 53', the sleeve 49 is mounted in the post 52 and extends through the sleeve 50, and the rock shaft 48 is mounted in post 51 and extends through the sleeve 49. The said rock shaft 48 and the mentioned sleeves, the latter being cut away to permit rotation, as indicated in Fig. 6, are respectively provided with slotted arms 53$^a$, adapted to be engaged by the mentioned studs 39 on the respective cores 34—38 inclusive, the arrangement being preferably such that the concealing segment, when the device is in a neutral or non-indicating position, hides both of the mentioned arrows, one of the latter being then directed upward and the other being directed downward, and both the concealing segment and the arrows being adapted to be rotated to the left (as seen from the rear) when a signal is to be given by the closing of a circuit through a corresponding setting coil. Fig. 7 indicates the neutral or non-indicating position referred to, the concealing segment being in a vertical position and thereby concealing both of the arrows 46 and 47. In Fig. 8, the concealing segment being left in its original position, the arrow 46 has been swung to the right, to indicate a right hand turn. In Fig. 9, both the indicating segment and the arrow 46 being left in their original positions, the arrow 47 has been swung downward to the left, to indicate a left hand turn; and in Fig. 10, both of the arrows being left in their original position, the concealing segment has been turned through an angle of 90°, thereby exposing the arrow 46, to indicate a stop. It will be understood that a stop signal is ordinarily of use only at the rear of a vehicle, and that the construction of the indicator at the front thereof may accordingly be simplified, to the extent indicated in the wiring diagram, Fig. 11.

To conceal the upper portion of the arrow 47, when a stop is to be indicated, and properly to reflect the rays of light from, for example, the tail light T to the indicator with which it is associated, a hood 54, provided with a reflecting lining or surface 54', may advantageously be provided, as best shown in Fig. 4.

While any preferred means might obviously be employed as a controlling system, for completing the respective circuits to the respective setting coils and restoring coils, I have shown in Figs. 2 and 3 certain details of my preferred construction, in which I employ a casting or other housing 55, secured to the steering post 56 by any convenient means such as bolts 57, this casting being preferably provided with a cover 58, which may be secured by screws passing through the openings 59. It may be provided also with slots 60 adapted to guide the vertical movement of the respective circuit closing levers $l$, $s$ and $r$, pivoted respectively at 61, 62 and 63, and adapted to cooperate with the respective contacts above and below the same, as best shown in Fig. 3. Resilient means, such as the springs 64, are advantageously employed to hold the respective switch arms or levers normally in an intermediate position, out of contact with either of the cooperating elements such as 32, 33, of Fig. 3.

It is believed that the operation of my signaling or indicating system will be fully understood from the foregoing description; but I may repeat that, as best illustrated in Fig. 3, I prefer to so dispose my circuit closing means that the same may be easily engaged by a finger without necessitating the removal of the operative's hand from the steering wheel; and it is also an important merit of the organization described that when a signaling contact has once been made, as by the elevating of one of the circuit closing levers, the frictional engagement of the core that is thereupon moved to a signaling position is such as to retain the same in said signaling position, even though the mentioned lever be released.

When it is desired to restore the signal to its non-indicating position, this may, of course, be done manually by so depressing the proper lever that the latter shall engage the alternative contact shown as arranged immediately below the same; but I have found it practicable to employ also an automatic means for effecting this return under certain conditions. As best shown in Figs. 1 and 3, I may, for this purpose, provide upon that quadrant of the steering wheel which is remote from the operative, a cam element, such as the downwardly curved member 66, adapted automatically to depress any or all of the contact levers $r$, $s$, and $l$, whenever the steering wheel is moved through an arc of 180° or more, as may ordinarily be done in the execution of a turn, the prospect of which may have been indicated in the manner above described.

It will be understood that various features of my described invention may be employed independently of other features thereof, and that various changes and modifications might be made without departing from the spirit of my invention as the same is indicated above and in the appended claim.

I claim:

A signal comprising a casing, a bracket mounted in the casing, a pair of bearing posts connected to the bracket, a sleeve rotatably mounted in the bearing posts, a third bearing post connected to the bracket, a second sleeve mounted in the third bearing post and extending through the first sleeve, a fourth bearing post connected to the bracket, a rock shaft mounted in the fourth bearing post and extending through the second sleeve, an arm fixed to the inner end of the first sleeve, a second arm fixed to the inner end of the rock shaft, a pair of coils mounted transversely above the plane of the first sleeve and spaced apart endwise and having a common core, a stud fixed in the common core between the coils and connected to the first arm, a second pair of coils mounted similar to the first pair of coils and having a second core, a second stud fixed in the second core and connected to the second arm, a third pair of coils mounted similarly to the first and second pair of coils and having a third core, a stud fixed to the third core and connected to the third arm, an indicating arrow fixed upon the front end of the first sleeve, a second indicating arrow fixed upon the front end of the second sleeve in front of the first arrow, a concealing segment fixed upon the front end of the rock shaft in front of the second arrow, and a glass plate in the casing in front of the concealing segment, said first mentioned arrow normally pointing upwardly and adapted to swing to the right to a horizontal position, said second mentioned arrow normally pointing downwardly adapted to swing to the left to a horizontal position, said concealing segment normally being in vertical position adapted to swing to a horizontal position.

In testimony whereof I have signed my name to this specification.

RONALD C. LUPLOW.